May 17, 1960 H. T. GIBSON 2,936,556
MAIL SORTING APPARATUS
Filed Feb. 4, 1959 12 Sheets-Sheet 1

INVENTOR
Harry T. Gibson
BY
ATTORNEYS

May 17, 1960    H. T. GIBSON    2,936,556
MAIL SORTING APPARATUS
Filed Feb. 4, 1959    12 Sheets-Sheet 4

INVENTOR
Harry T. Gibson
BY
Penrie, Edward, Morton, Lansau & Taylor
ATTORNEYS

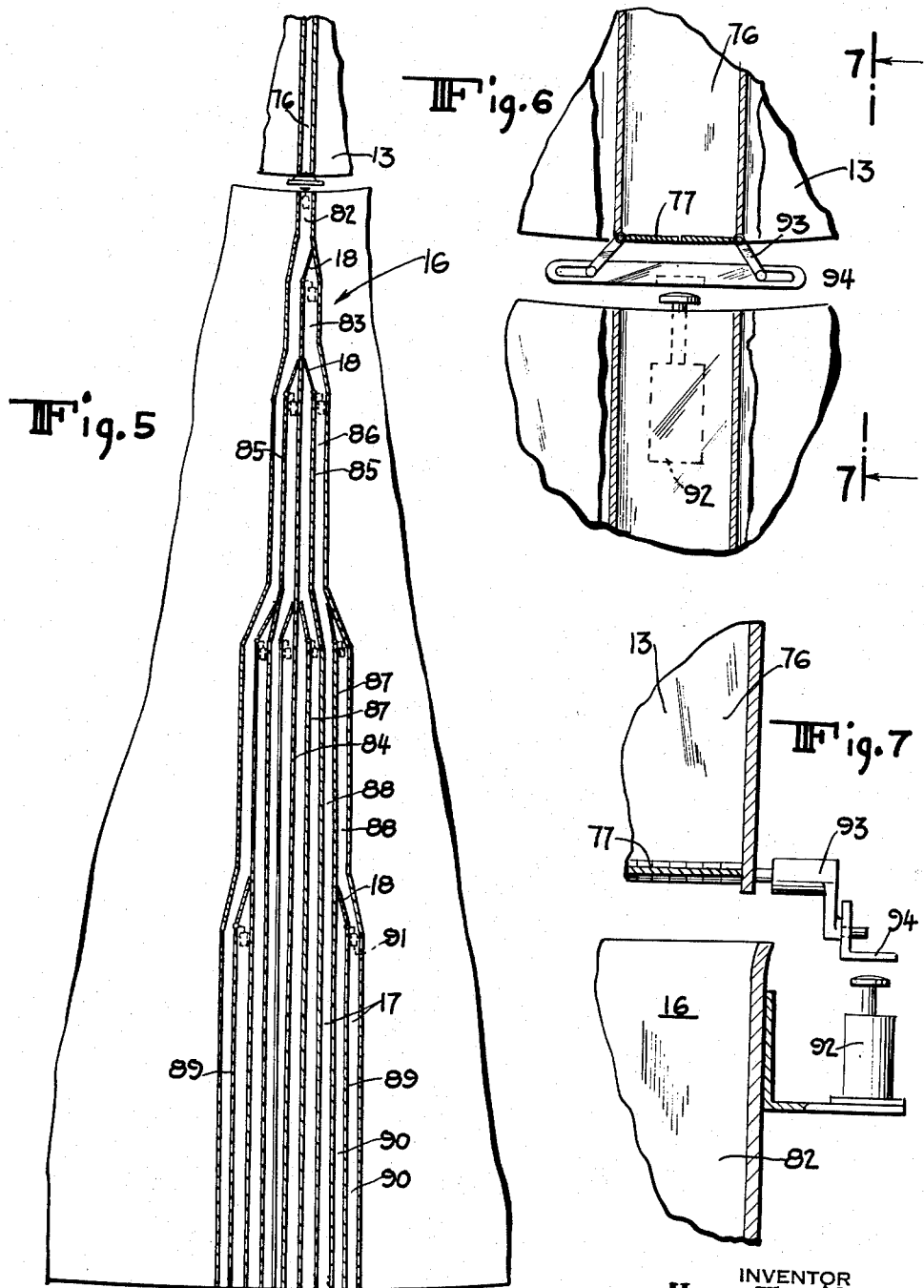

May 17, 1960  H. T. GIBSON  2,936,556
MAIL SORTING APPARATUS
Filed Feb. 4, 1959  12 Sheets-Sheet 6

INVENTOR
Harry T Gibson
BY
ATTORNEYS

May 17, 1960

H. T. GIBSON 2,936,556

MAIL SORTING APPARATUS

Filed Feb. 4, 1959

INVENTOR
Harry T. Gibson
BY
Pennie, Edmonds, Morton, Barrows & Taylor
ATTORNEYS

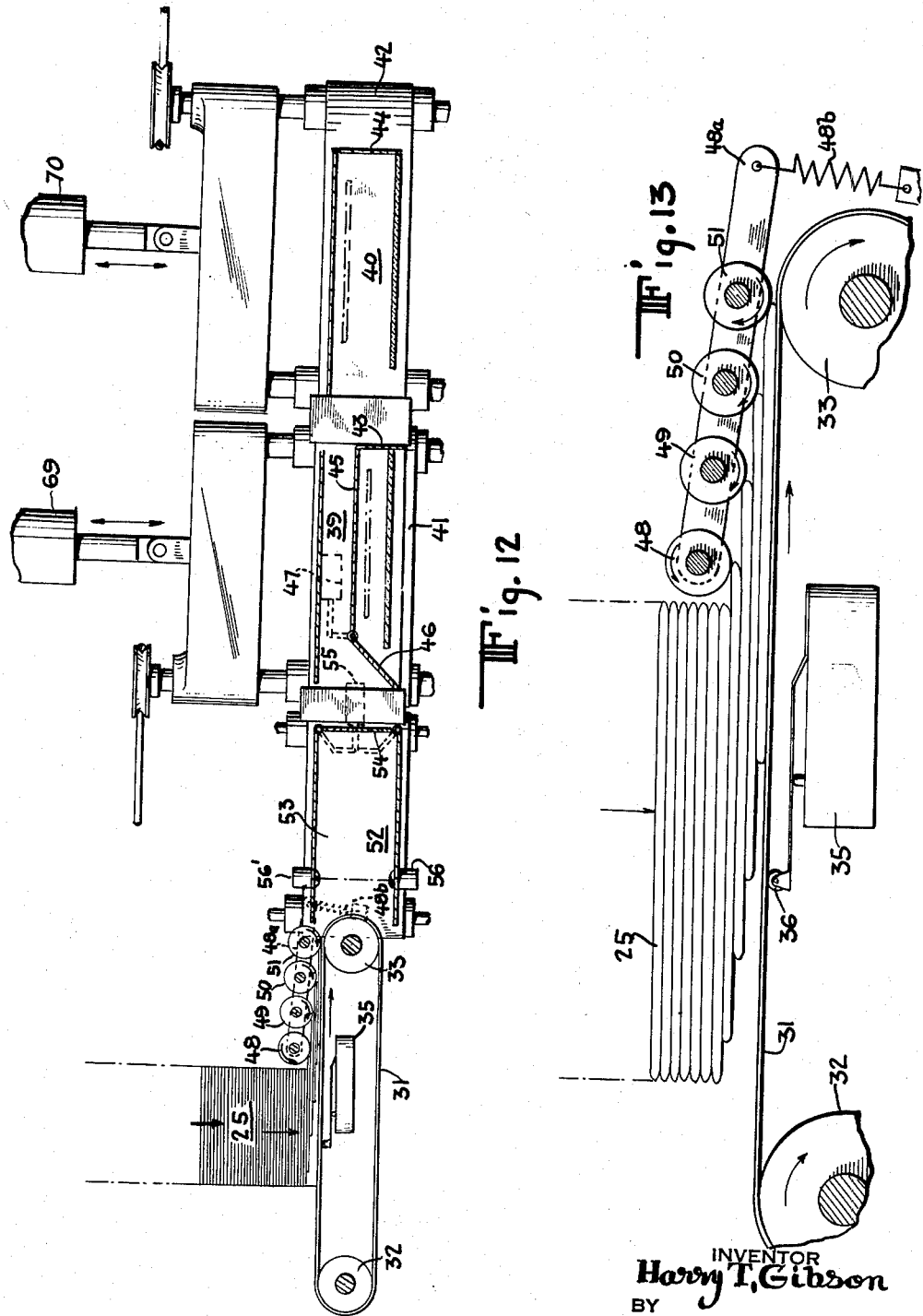

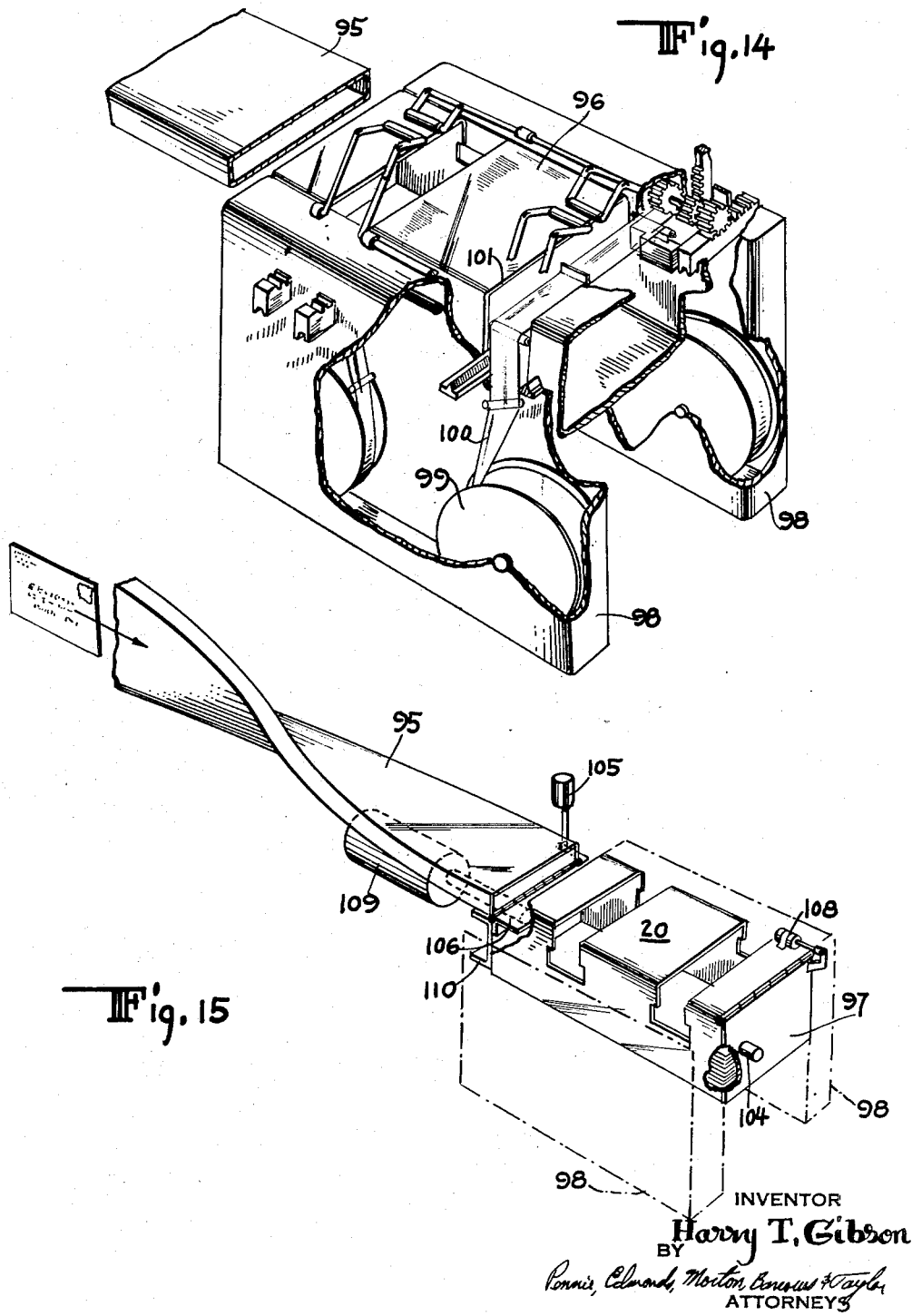

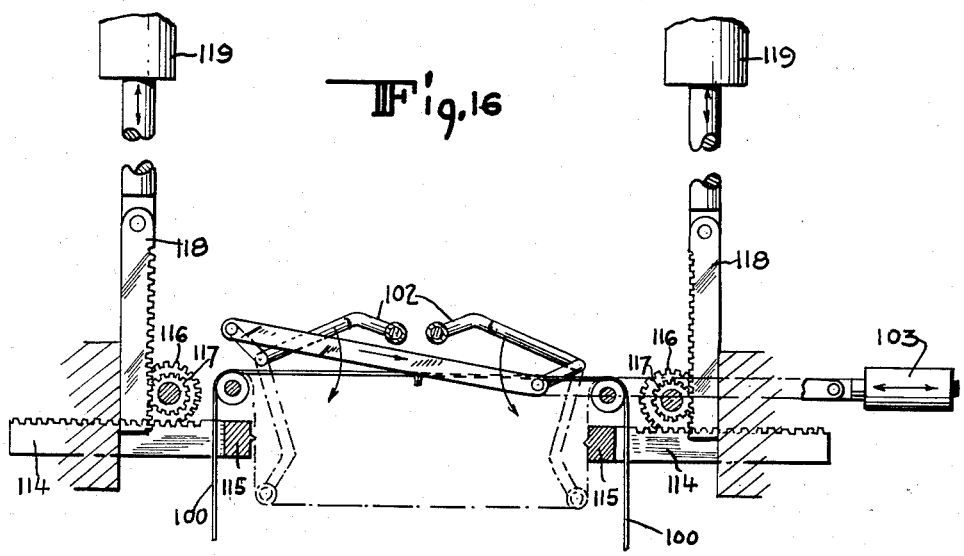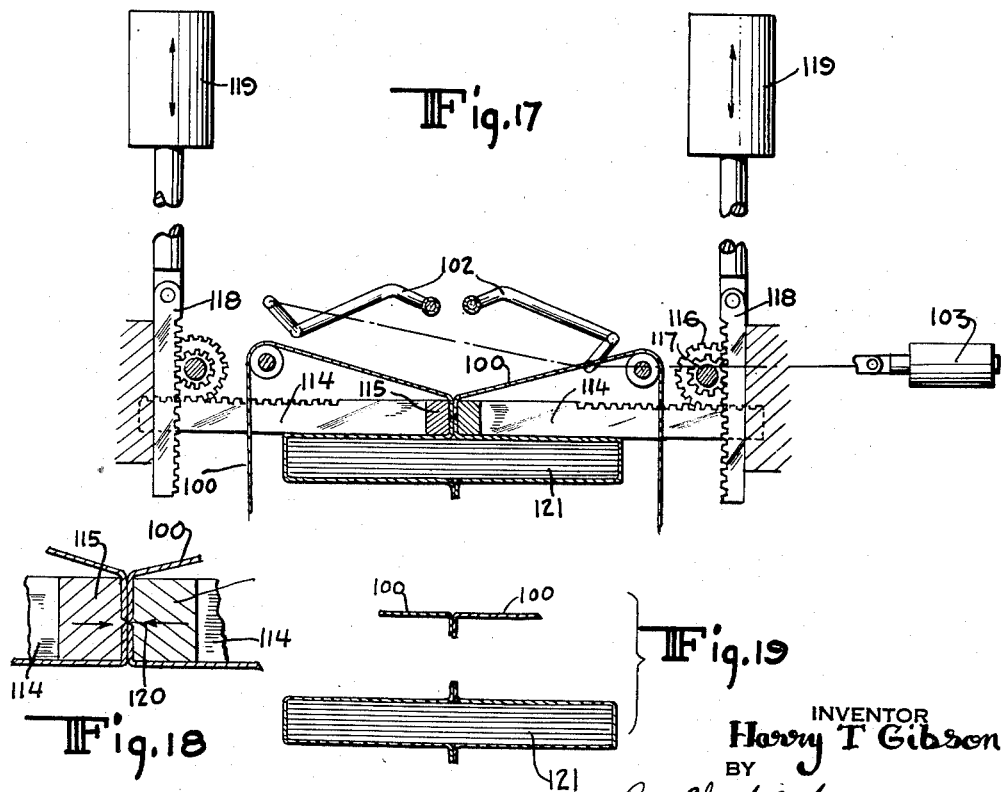

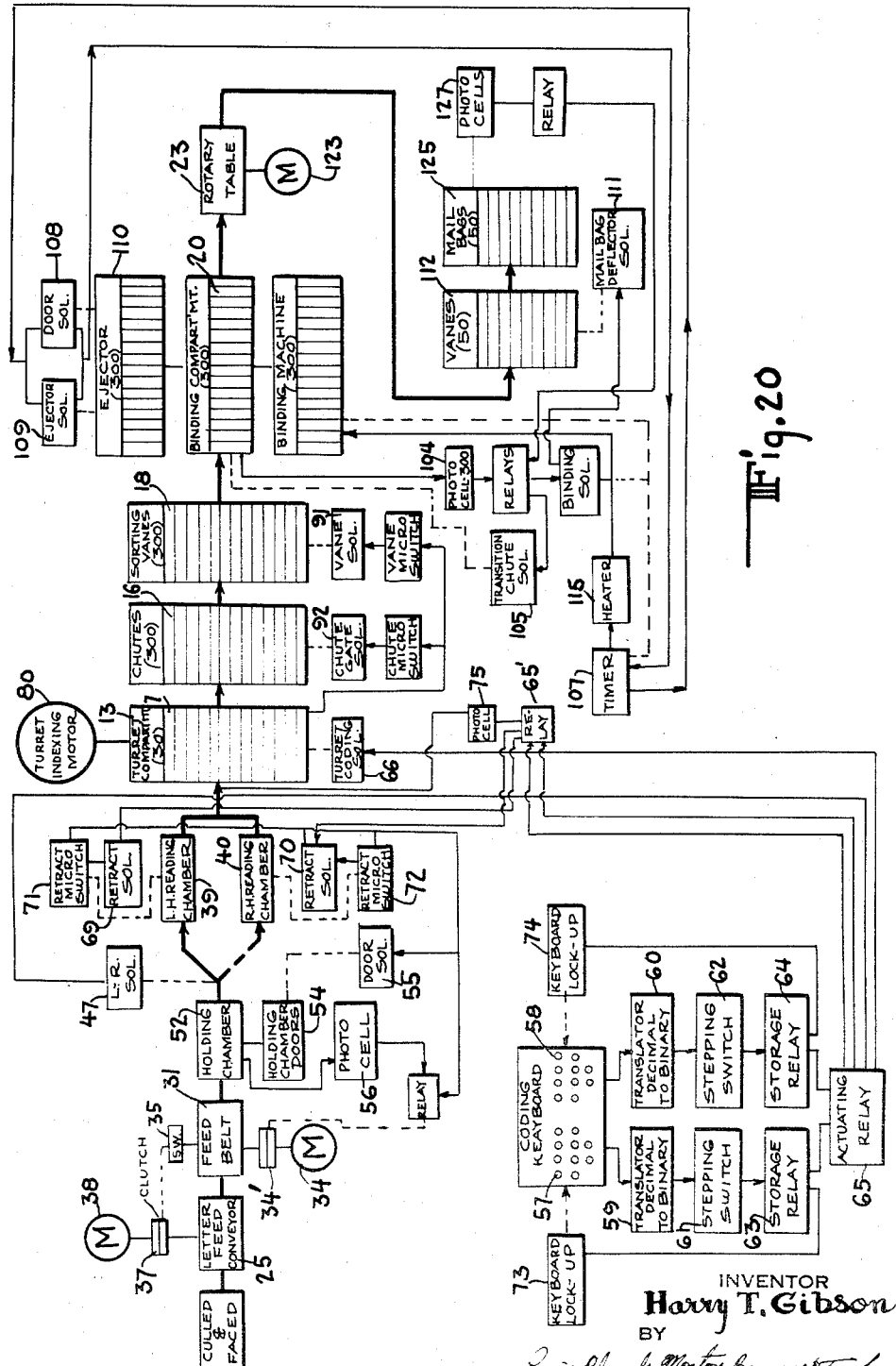

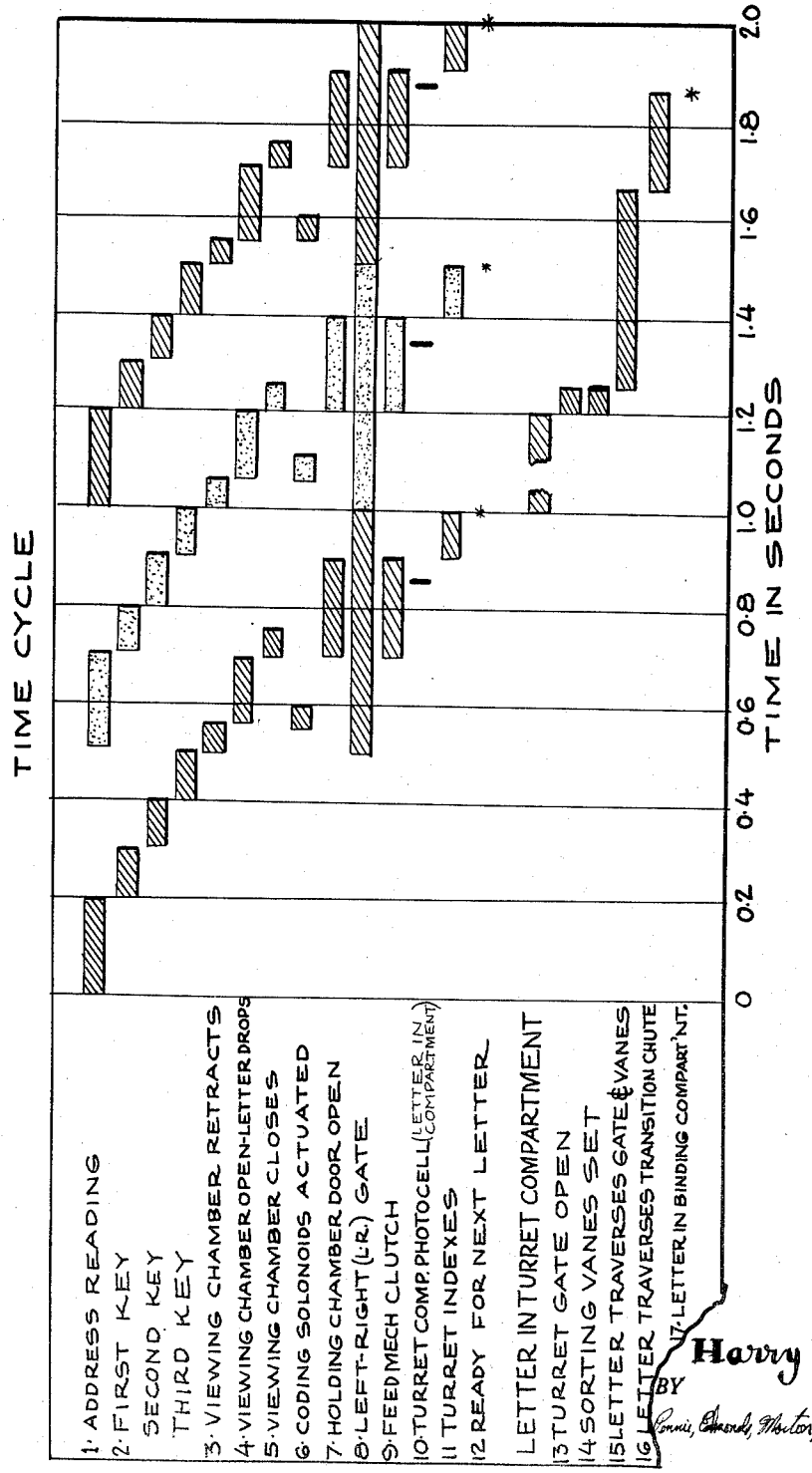

United States Patent Office 2,936,556
Patented May 17, 1960

2,936,556

MAIL SORTING APPARATUS

Harry T. Gibson, Silver Spring, Md., assignor to U.S. Industries, Inc., New York, N.Y., a corporation of Delaware Application February 4, 1959, Serial No. 791,143

45 Claims. (Cl. 53—74)

The present invention relates to apparatus for sorting and distributing mail, and more particularly to simplified and substantially improved arrangements for handling and routing mail in accordance with its intended destination and for otherwise rendering the distribution of mail substantially more efficient and economical. The new apparatus, while specifically intended for use in sorting mail, is not limited thereto and is equally applicable to the sorting of such items as punch cards, hardware, packages, and electronic components, for example.

The concept of sorting and distributing mail by mechanical means is, broadly, quite old, and various arrangements have been proposed, heretofore, for this purpose. Apparatus of known design, however, has been subject to severe limitations, for one or more of several reasons, so that the widespread use of mechanical mail sorting equipment of comprehensive design has not yet occurred, notwithstanding a long recognized need therefor. Thus, in general, mail sorting machines of known design are deficient either in their ability to perform sufficient handling and/or distributive operations or they are of such physical bulk and/or mechanical complexity as to be unsuitable for widespread, practical use.

In accordance with the present invention, a novel and improved mail sorting apparatus is provided which, while being of minimum physical size and of generally simplified nature, is capable of performing a large number of handling and distributive operations at a high rate of speed. The new apparatus, while being adaptable readily to fully automatic operation, is specifically intended for semi-automatic operation, wherein letters are presented successively to the view of an operator who, by means of a keyboard or other control instrumentality, directs the functions of the apparatus. And, to this end, the new apparatus is designed to utilize, to the fullest practicable extent, the mental and physical capabilities of the operator. Thus, in a machine of relatively small size and of a generally simplified nature, a large number of handling and distributive functions may be carried out individually on successive articles or pieces of mail, and the processing of letters may be accomplished at a rate substantially as fast as the operator is able to view successive letters and perform the necessary mental and physical operations to direct the machine. By way of example, the apparatus of the present invention is capable of handling mail delivered thereto successively at the rate of one article every 500 milliseconds, or at the rate of 7,200 articles per hour.

One of the principal features of the invention is the provision of a mail sorting apparatus incorporating a novel and improved distributive system, including primary distributing means, having a plurality of mail receiving compartments movable through a predetermined path, and secondary distributing means, including a plurality of main channels positioned to be visited successively by the primary distributing means and to receive mail therefrom in accordance with directive control imparted to the apparatus. Each main channel of the secondary distributing means is subdivided into a plurality of secondary channels, and mail discharged into a main channel is routed to a predetermined secondary channel thereof in accordance with the directive control previously effected by the machine operator. Although the invention is by no means limited to a particular number of compartments and/or main and secondary channels, a typical apparatus of practical size may conveniently incorporate a primary distributing system with thirty compartments and a secondary distributing system with thirty main channels, each subdivided into ten secondary channels. In such an apparatus, the mail may be routed to any of three hundred "destinations."

In accordance with another aspect of the invention, improved binary code control means are provided for directing the handling and distributive functions of the sorting apparatus. In a semi-automatic machine, the code control is actuated by the machine operator upon viewing the addressed destination on a letter. Thereupon, the letter is discharged into a compartment of the primary distributing means and conveyance of the letter about the primary distribution path is initiated. The directive control thus imparted to the machine remains in effect at least until the compartment containing the letter reaches a predetermined main channel of the secondary distribution system, at which time the letter automatically is discharged into the main channel and routed into a predetermined secondary channel thereof. The improved control arrangement also is such that the code control for a particular compartment remains effective, once set, until the letter is discharged from the compartment and while other successive letters are viewed and other compartments are placed under control. The discharge of letters from the primary distribution system and the routing of the letters through the secondary distribution system occurs independently of the subsequent coding operations. Likewise, letters may be discharged simultaneously from several compartments of the primary system, as the main channels of the secondary system are visited successively. Accordingly, a large number of distributive and other operations may be carried out on a letter over a period of time substantially in excess of the interval between the presentation of successive letters to a viewing station and the discharge of such letters into the primary distributive system.

Another important aspect of the invention resides in the provision of facilities for effecting the initial distribution of letters into a large plurality (e.g., 300) of "destination" compartments, periodically securing a plurality of letters in a destination compartment into a visually or otherwise identified "bundle," and directing the identified bundles to appropriate ones of a lesser plurality (e.g., 50) of receivers, such as mail pouches. Thus, mail destined ultimately for a variety of places is bundled and coded in accordance with its destination and then consolidated and discharged into a mail pouch for shipment to a large city or distribution center, for example, from which the individual bundles may be distributed to outlying areas.

One of the important specific features of the invention resides in the physical configuration of the apparatus, which is such that a practical minimum of space is required for an installation and also such that, to a large degree, the conveyance of mail is effected by means of gravity. The latter is of particular importance in a comprehensive, high-speed machine of the type contemplated since the number of moving parts may be held at a practical minimum, resulting in significant reductions in capital outlay and maintenance costs as well as in lower noise level in operation.

The invention also includes a variety of specific features, relating to the routing and handling of the mail at various stages and the controlling of the many operations of the apparatus. Accordingly, for a complete understanding of the invention, reference should be made to the following detailed description and to the accompanying drawings, in which:

Fig. 3a is an enlarged, fragmentary view of code control means incorporated in the apparatus of Fig. 3;

Figs. 4 and 5 are fragmentary, perspective and plan views, respectively, of a mail distribution system forming part of the apparatus of Fig. 1;

Fig. 6 is an enlarged, fragmentary view of a portion of the system illustrated in Fig. 5;

Fig. 7 is a fragmentary, sectional view taken generally on line 7—7 of Fig. 6;

Figs. 12 and 13 are diagrammatic representations of means, incorporated in the apparatus of Fig. 1, for conveying letters individually to a viewing station;

Figs. 14 and 15 are perspective views of destination compartments incorporated in the apparatus of Fig. 1, for receiving sorted mail and binding it into coded bundles of the type shown in Fig. 9;

Figs. 16–19 are sequential, diagrammatic views illustrating the operation of the mail binding means provided in the destination compartments of Figs. 14 and 15;

Fig. 20 is a diagrammatic representation of the control system for operating the apparatus of Fig. 1; and Fig. 21 is a time cycle diagram illustrating the operation of the apparatus of Fig. 1.

Figure 1:
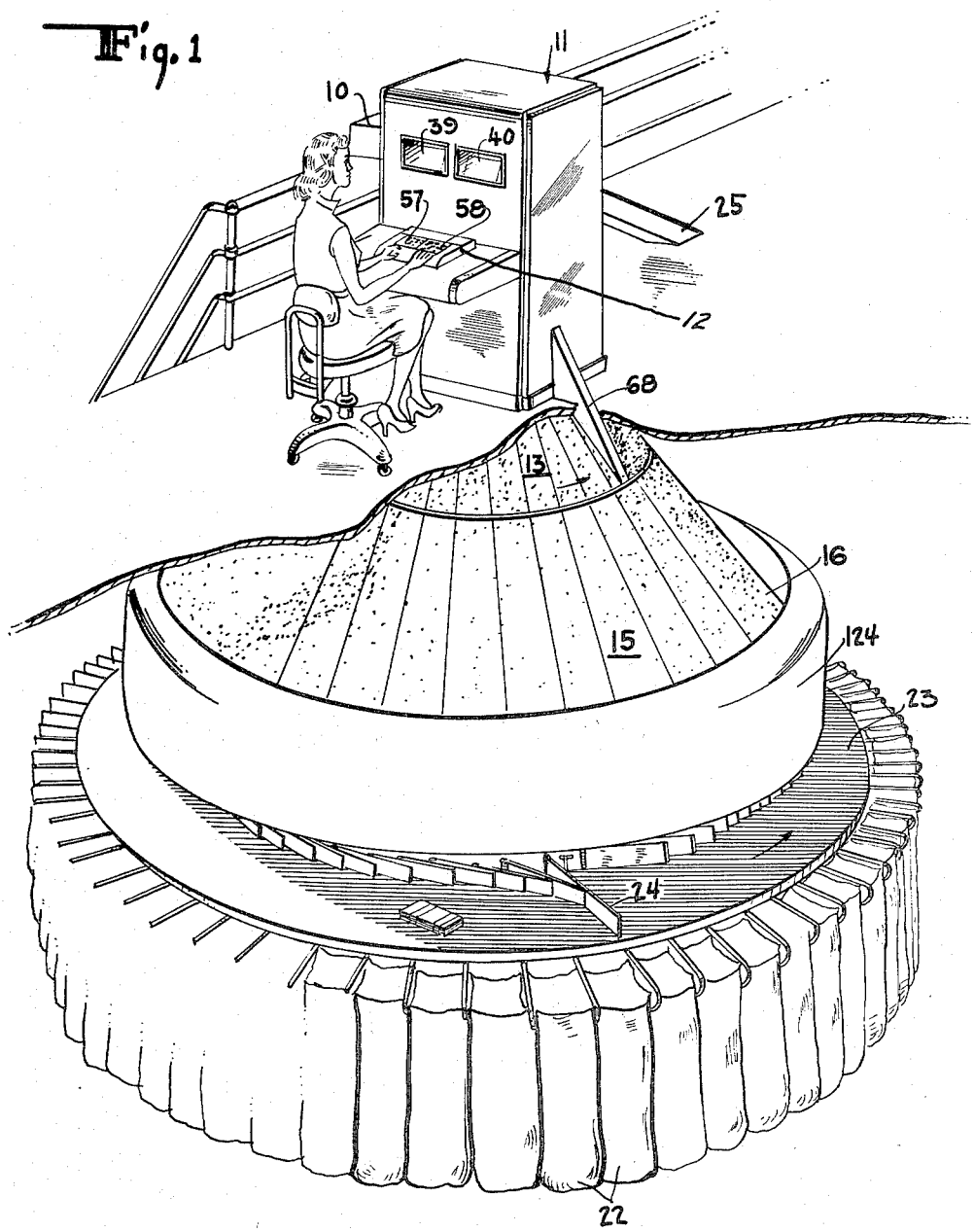
Fig. 1 is a perspective view of a mail sorting apparatus incorporating the features of the invention.

Referring now to the drawings, the apparatus of the invention comprises, in general, conveyor means 10 for feeding letters successively to a viewing station 11, which includes a keyboard 12 or other control means. As letters are presented successively to the viewing station, the addresses thereon are read by an operator, who actuates the keyboard 12 accordingly and causes the letters to be discharged individually to a primary distribution means 13, which advantageously is in the form of a rotary turret of generally conical shape. The turret has a plurality of compartments, each to receive a single letter, and each compartment has associated therewith control means, such as a set of code bars 14 (Fig. 3) forming part of a binary code control system. The code bars are set in combinations of active and inactive positions by the keyboard control and serve to determine the further distribution of a letter after it is received in a turret compartment. As successive letters are received by the turret, successive rotary indexing movements of the turret are caused to occur, so that empty compartments are constantly presented to the mail receiving position and the filled compartments are advanced stepwise around a predetermined distribution path.

Disposed below the turret is a secondary distributing system 15, which advantageously is of frusto-conical (frustum of a cone) form, to continue the generally conical outline of the turret, and which is divided into a plurality of main channels 16. In the illustrated apparatus the number of main channels 16 is equal to the number of turret compartments so that, in all indexed positions of the turret, each compartment of the turret will be aligned with a secondary channel 16. Each of the main channels 16 is divided, advantageously in a binary manner, into a plurality of secondary channels 17 (Fig. 4), and appropriate directive vanes 18 are provided to route mail to a preselected one of the secondary channels.

As the turret compartments and the sets of code bars associated therewith are rotated stepwise about the turret axis, the sets of code bars successively engage sets of switches 19 associated with each of the main channels 16. When a set of code bars meets a set of switches wired in the proper combination, a turret compartment is opened and a letter is discharged therefrom into the aligned main channel. At the same time, selected ones of the switches are actuated by selected ones of the code bars to set the directive vanes 18 of the main channel, so that the letter is directed into a predetermined one of the several secondary channels 17.

Figure 9:
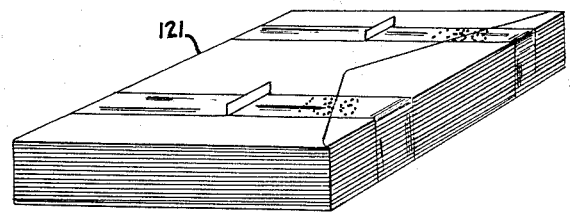
Fig. 9 is a perspective view of a packet of sorted mail as bundled and identified by the apparatus of Fig. 1.

Due to the conical configuration of the primary and secondary distributing means, the movement of letters therethrough is effected largely by gravity, and the letters discharged into the secondary distribution system drop to the lower ends of the secondary channels 17 thereof. At the bottoms of each of the channels 17 there is provided a destination compartment 20 (Figs. 14, 15) which is adapted to receive a plurality of letters. Each destination compartment includes means to determine the presence in the compartment of a predetermined amount of mail and means actuated in response thereto to bind the accumulated mail into bundles. Advantageously, coded tape printed with a code number is utilized to bind the mail, so that the completed bundles thereof (see Fig. 9) are provided with a destination code to facilitate further handling.

In the illustrated form of the invention, the mail is sorted into a large plurality (e.g., 300) of categories, each served by a destination compartment having coded binding means. However, further distribution of the mail to distant cities and their outlying areas, for example, renders desirable a consolidation of the various categories, so that mail addressed to a plurality of ultimate destinations may be transported to a distribution center in a single mail pouch or other container. To this end, the apparatus of the invention includes support means 21 (Fig. 3) surrounding the destination compartments at the base of the conically configured distribution system. The support means 21 holds a plurality of containers 22, such as mail pouches in open positions about the edge of a rotating annular table 23. Disposed about the table 23 are vanes 24 equal in number to the mail pouches 22 and adapted to be moved into obstructing relation to the table whereby to deflect bundles of mail carried by the table into a predetermined mail pouch. Advantageously, each mail pouch serves a plurality of destination compartments and the appropriate deflecting vane 24 is actuated automatically prior to the discharge from any compartment of a bundled packet of mail.

Referring to the apparatus in more detail, mail is delivered toward the viewing station 11 by means of an elevator conveyor 25 (Fig. 10) which may extend to a floor below that on which the viewing station is located, as indicated in Fig. 1. The elevator conveyor 25 comprises a belt 26 which is provided at spaced intervals with arms 27 urged to retracted positions, substantially flush with the surface of the belt, by means of springs 28. Wheels 29 are mounted on the arms, inside the loop of the belt 26, for cooperation with fixed, U-shaped cam tracks 30, which are also mounted inside the belt loop. The cam tracks 30 are positioned to engage the wheels 29 as they approach the upward moving reach of the belt loop and to cause the arms 27 to be moved to and retained in projected positions during their upward movement. At a predetermined point, along the upper, horizontal reach of the belt loop, the arms 27 are positively retracted by the cam tracks 30 as they diverge away from the belt.

At the lower end of the elevator conveyor, mail is placed on the belt 26 in a manner such that the addressed side of each letter faces upward. It is contemplated that this operation will be carried out by hand. Since, along the upward moving reach of the belt, the arms 27 are projecting from the belt, the letters are held on edge, generally perpendicular to the belt 26.

Figure 10:
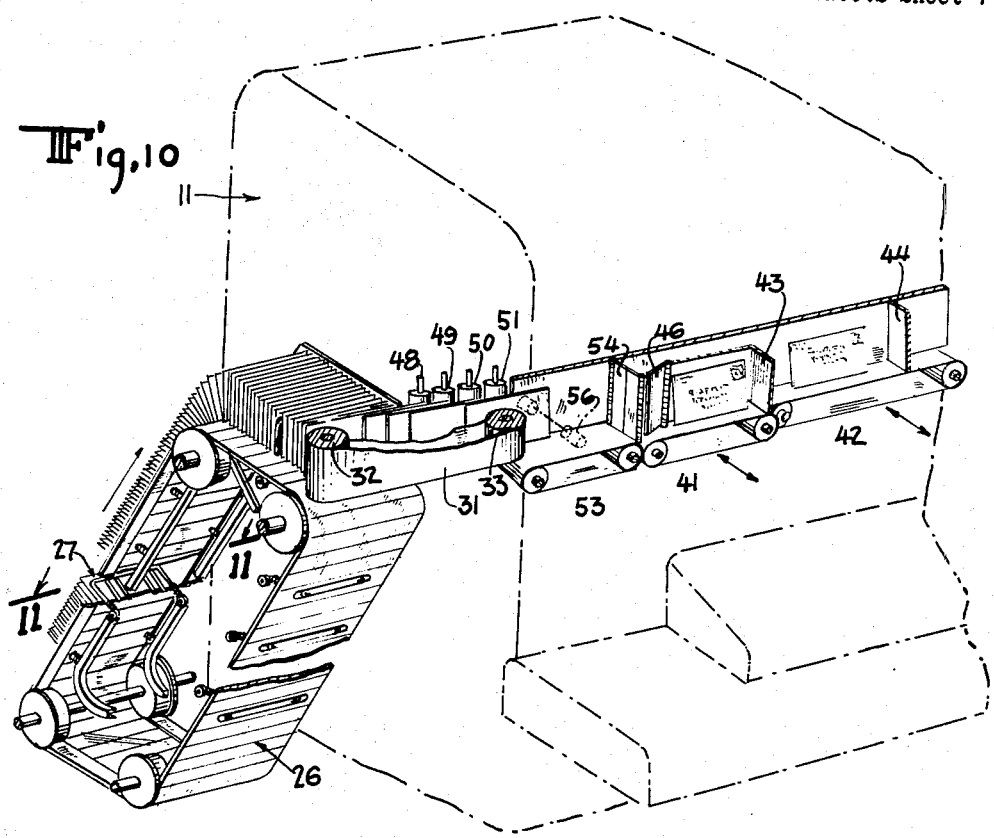
Fig. 10 is a fragmentary, perspective view of a letter conveyor system incorporated in the apparatus of Fig. 1.
Figure 11:
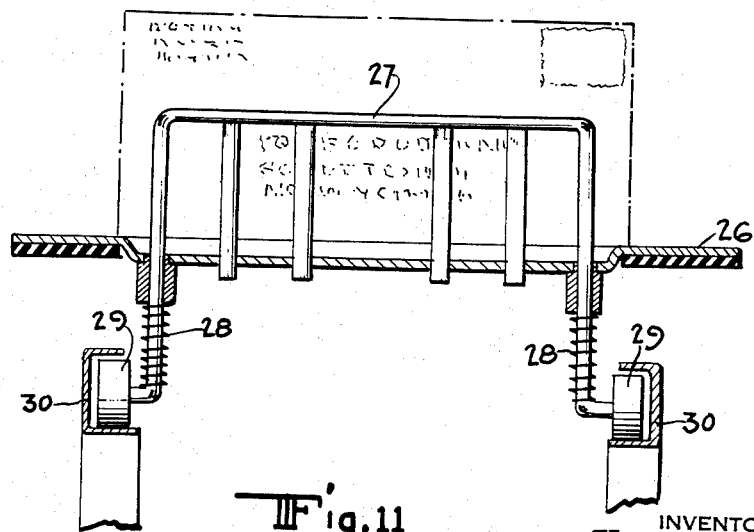
Fig. 11 is an enlarged, cross-sectional view taken generally on line 11—11 of Fig. 10.

As shown in Fig. 10, the uniformly oriented letters are advanced in stacked relation toward and into contact with a feed belt 31, which is entrained about vertically disposed rollers 32, 33. The belt 31 is driven by a motor 34, through an electrically operated clutch 34' (Fig. 3), at predetermined times, to convey letters transversely off the advancing stack. Proper frictional contact between the feed belt 31 and the front letters of the advancing stack thereof is assured by means of a switch 35 (Fig. 13) operated by a roller actuator 36 positioned behind the active reach of the feed belt 31. The switch 35 controls a clutch 37 (Fig. 20), which connects the elevator conveyor 25 with its drive motor 38, in such manner that the elevator conveyor 25 is caused to advance the stack of letters until a predetermined pressure contact is established between the front letter and the feed belt. When such contact is established, the switch 35 is actuated to disengage the clutch 37. The elevator conveyor thus advances letters to the feed belt 31 "on demand," in accordance with the pressure on the feed belt.

Letters advanced to the feed belt 31 are, in accordance with the invention, fed successively and individually to alternate viewing or reading chambers 39, 40 of the viewing station 11. The chambers 39, 40 are arranged to support letters in position to be observed through windows from the operator's position, as shown in Fig. 1, so that the operator may read the address on a letter and actuate the machine controls in accordance therewith. To this end, the chambers 39, 40 are provided with bottom walls formed by travelling belts 41, 42, which may be referred to as viewing chamber belts, and end walls 43, 44 disposed, in the illustrated apparatus, at the right hand ends of the chambers. The belts 41, 42 advantageously are driven continuously in one direction by suitable drive means (not shown) to advance letters, fed in upright positions, to the right and into contact with the end walls 43, 44. When a letter engages the end wall of its chamber, it is in proper position for viewing and is retained in such position until discharged from the chamber in a manner to be described. Letters held in viewing positions merely slide over the tops of the continuously moving belts 41, 42.

As will be observed in Fig. 12, the left hand viewing chamber 39 is provided with a back wall 45 which, in effect, divides the belt 41 into front and back portions. The arrangement is such that letters directed onto the front portion of the belt 41, from the left, will be conveyed into the left viewing chamber, until engaged by the end wall 43. Letters directed onto the back portion of the belt 41 will, however, be conveyed behind the left viewing chamber, onto the belt 42 and into the right hand viewing chamber 40. In accordance with one aspect of the invention, letters are conveyed alternately to the left and right hand viewing chambers and, to this end, there is provided a directive vane 46, hinged on the back wall 45 of the left viewing chamber and arranged to be actuated by a solenoid 47 between two positions, to deflect letters, fed from the left, in front of or behind the back wall 45 of the left viewing chamber. The actuation of the solenoid 47 is such, as will be described further, that the vane 46 is actuated alternately to its two effective positions, whereby successive letters are fed alternately to the left and right viewing chambers.

The feeding of letters individually to the viewing chambers is accomplished by means of the feed belt 31, operating in conjunction with a plurality of rollers 48–51, which delivers letters to a holding chamber 52. The bottom wall of the holding chamber is formed by a continuously operating belt 53, which may be referred to as the holding chamber belt, and gates 54, which normally are closed to form a right hand end wall but which may be opened at desired times by a solenoid actuator 55.

A letter is delivered to the holding chamber 52 by actuation of the feed belt 31 and the cooperating rollers 48–51. Advantageously, the first roller 48 of the plurality thereof is driven to rotate in a direction to assist the feed belt 31, or in a counterclockwise direction as viewed in Figs. 12 and 13. The remaining rollers 49–51, which may be referred to as feedback rollers, are driven to rotate in the opposite or clockwise direction. In addition, the rollers are mounted so that each roller, from left to right, is closer to the belt 31 than the next preceding roller, and the last roller 51 of the series is advantageously positioned opposite the roller 33, about which the feed belt is trained. The rollers 48–51 are mounted on a common frame 48a, for pivoting movement about the axis of roller 48, and spring means 48b are provided to urge the rollers toward the feed belt 31. Thus, when the feed belt and rollers are set in motion, a plurality of letters may be fed to the right by the belt and roller 48. Successive letters are, however, engaged and held by the feedback rollers 49–51, so that only one letter at a time is passed between the rollers 33, 51. Letters of various thicknesses are accommodated by the resilient pivoting of the rollers 48–51 on the frame 48a.

The letter fed between the rollers 33, 51 is delivered to the holding chamber belt and conveyed further to the right thereby toward and into contact with the then closed doors 54 of the holding chamber. Advantageously, the belt 53 operates continuously, so that the letter is held in contact with the doors 54 by the belt 53, which slips under the letter. The feeding of more than one letter at a time into the holding chamber 52 is prevented by means of a photocell detector 56, and light source 56', which detect the trailing edge of a letter and deenergize the clutch 34' (Fig. 20) for the feed belt 31 and associated rollers.

When at least one viewing chamber is presented with a letter, an operator, positioned in front of the chamber, observes the address on the letter and actuates a keyboard control in accordance with such address. In the illustrated apparatus, incorporating left and right viewing chambers, there are provided two separate keyboards 57, 58, one for each chamber. Also, in the illustrated apparatus, a total of three hundred destinations is provided for the letters, each such destination having a distinctive keyboard combination. A ten-key board is convenient for this purpose, arranged so that the depression of three keys in sequence sets up a code corresponding to the units, tens and hundreds numbers of the desired destination code. The decimal code of the keyboard is advantageously translated to binary code form by translator means 59, 60 (Fig. 20) and the individual key actuations are placed in the proper register by suitable means, such as stepping switches 61, 62.

As the operator depresses the third key of a board, an appropriate storage relay system 63 or 64 for the board is energized to activate an actuating relay system 65 and, in turn, appropriate ones of a set 66 of coding solenoids. The set 66 of coding solenoids comprises a solenoid for each of the code bars and, if appropriate, an additional solenoid operable ahead of the others to clear the code bars of their prior code. The coding solenoids 66 are mounted within the conical structure of the distribution system, in position to act upon the code bars of a set 14 associated with one compartment of the turret 13. That compartment is, is accordance with the invention, the one then positioned to receive mail discharged from the viewing chambers 39, 40. Accordingly, when a keyboard is actuated in accordance with the address on a letter in the viewing chamber served by the keyboard, the code bars for the turret chamber ultimately to receive the letter are set to correspond with the destination of the letter.

Figure 2:
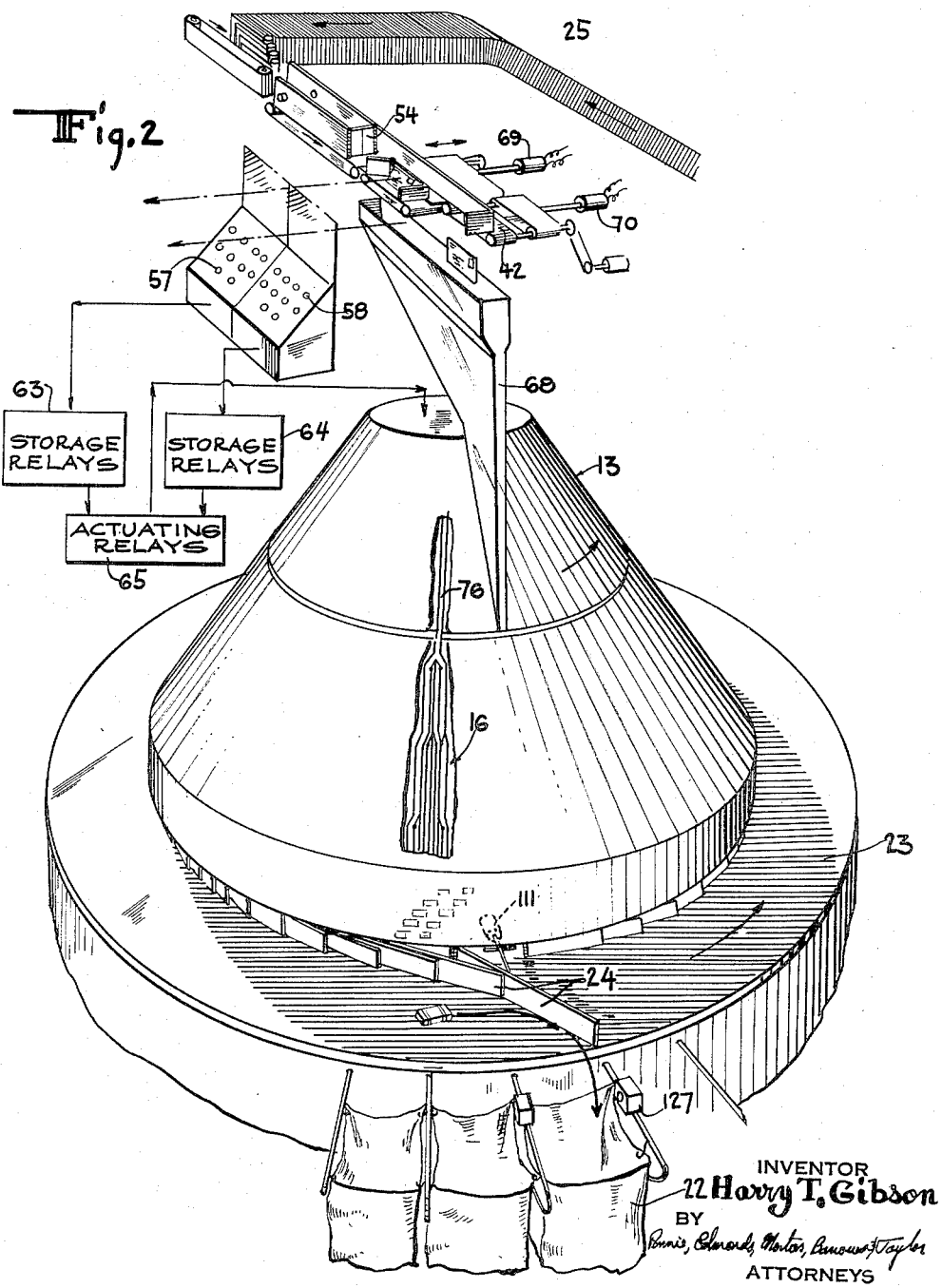
Figs. 2 and 3 are diagrammatic representations of the apparatus of Fig. 1, illustrating the operation thereof.

Substantially simultaneously with the depression of the third key of a board, and in response thereto, the letter from which the code was derived is discharged by gravity into an inclined chute 68 (Fig. 3) leading to the coded turret chamber, located below the viewing chamber. To this end, the viewing chamber belts 41, 42 are mounted for retracting movement, as indicated best in Figs. 2 and 12. The belts 41, 42 are positioned directly over the top opening of the chute 68 and are mounted for sliding movement transverse to the direction in which letters are fed to the viewing chambers. Suitable solenoid actuators 69, 70 engage movable frames for the holding chamber belts, so that the belts may be retracted bodily at appropriate times, to effect the discharge of letters into the chute 68. Thus, upon complete actuation of the keyboard 58, for example, the solenoid 70 is actuated, through relay means 65' energized by the actuating relay 65, to retract the belt 42 and discharge a letter from the right hand viewing chamber into the chute 68 and via the chute to the turret chamber just coded. Substantially immediate return of the belts 41, 42 to their normal positions, after retraction, may be effected by means such as switches 71, 72 (Fig. 20) positioned to be actuated upon full retraction of a belt.

As soon as the operator completes the coding operation for a letter in the right hand viewing chamber, for example, he can begin substantially immediately coding for a letter in the left chamber, by depressing keys of the left board 57, appropriate key board interlocking means 73, 74 (Fig. 20) being provided, however, to prevent coding at a greater rate of speed than the machine can handle the letters. During the coding of the letter in the left chamber, a new letter is fed to the right hand chamber. This is accomplished by switches 71, 72 effecting the energization of the clutch 34' and the holding door solenoid 55. The letter in the holding chamber is advanced immediately through the chamber doors 54, toward the right hand viewing chamber 40, and a new letter is fed to the holding chamber 52 by the feed belt 31 and associated rollers 48–51. When the new letter passes the photocell detector 56, the clutch 34' is deenergized, to prevent further feeding, and the holding chamber doors 54 are closed by the energization of the solenoid 55. The preceding letter, advanced out of the holding chamber, is directed to the right hand viewing chamber, rather than the left hand chamber, by the directive vane 46 which is actuated to the position shown in Fig. 12 in response to the completion of coding for the letter previously in the right hand chamber. The vane 46 is, likewise, actuated to its alternate position in response to the completion of coding for a letter in the left hand viewing chamber.

When a letter is discharged from its viewing chamber, after coding, it is directed by the chute 68 into the compartment of the turret 13, for which a group of code bars has just prior thereto been set in a predetermined combination of active and inactive positions. A photocell detector 75, advantageously mounted near the exit of the chute 68, is actuated by the passage of the discharged letter and serves to effect indexing of the turret, to bring the next compartment thereof into alignment with the discharge chute. Actuation of the photocell detector 75 also operates to release an interlock, permitting the discharge of the next successive letter from a viewing chamber and releasing the keyboard interlock 73 or 74 for the keyboard serving the other viewing chamber. In other words, a letter cannot be discharged from the left hand viewing chamber, for example, until the previous letter, discharged from the right hand chamber, has been received in the appropriate turret compartment to permit the turret to be indexed. Likewise, coding of a letter in the right hand chamber cannot be initiated prior to the discharge of a previously coded letter from the right hand chamber.

Figure 3:
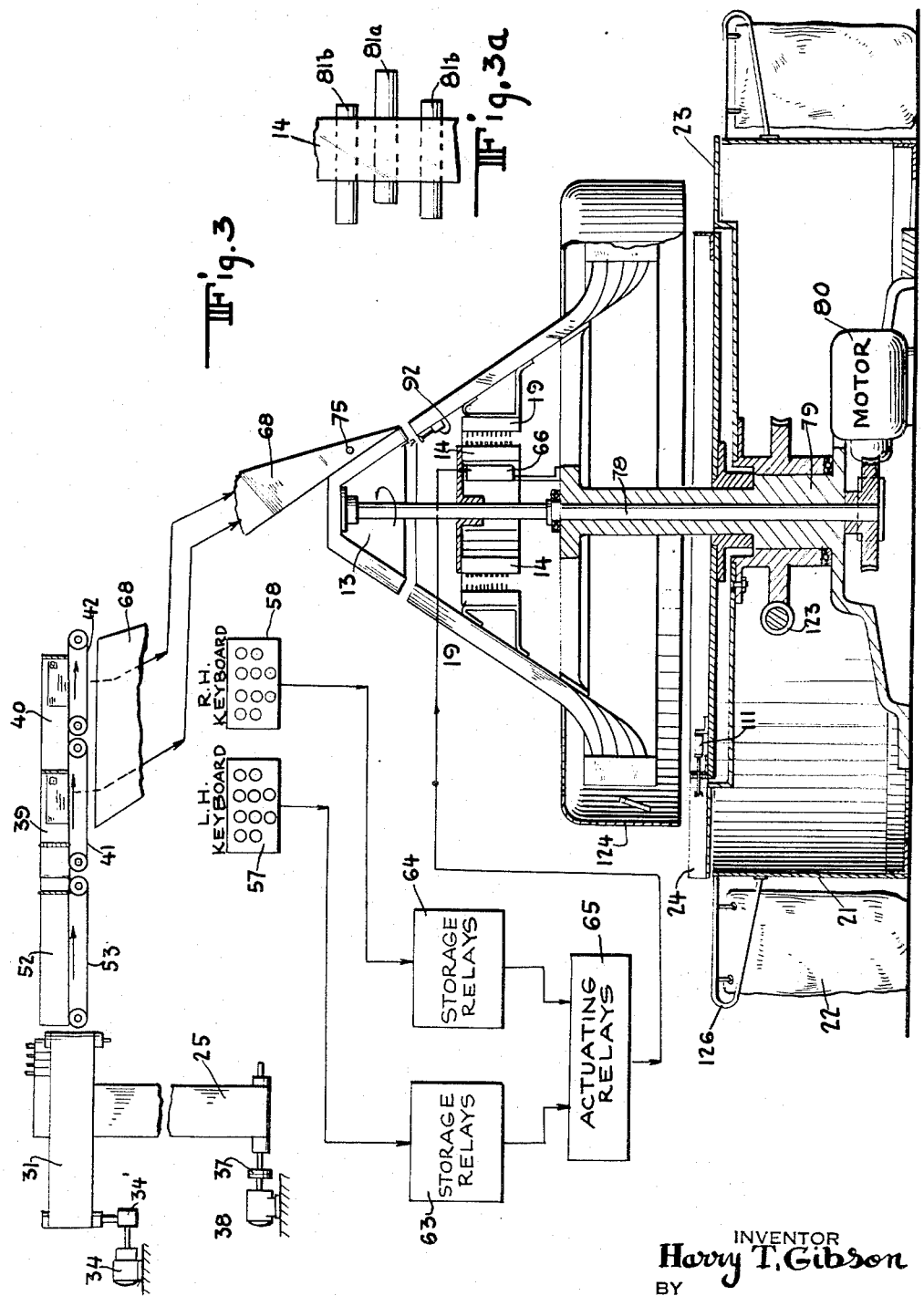
Figure 4:
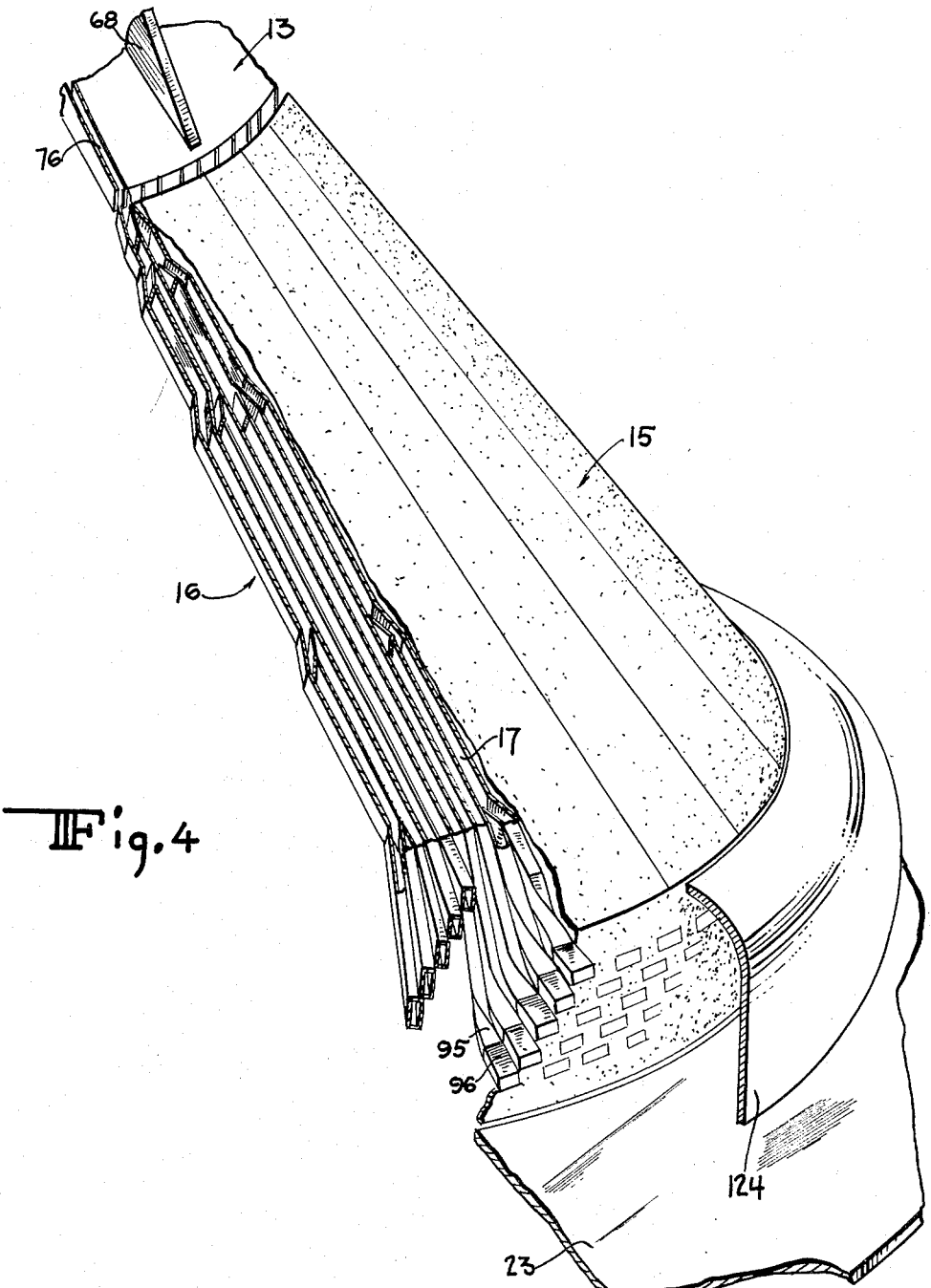

In accordance with one aspect of the invention, the turret 13 is of generally conical form and is divided into a plurality of radially disposed, inclined compartments, as shown at 76 in Figs. 3 and 4, for example. The compartments 76 are uniformly spaced about the turret structure and, in the illustrated form of the invention, the turret is provided with thirty compartments, spaced twelve degrees apart about the turret and of appropriate dimensions to hold letters on edge. The lower end wall of each compartment is formed by suitable doors 77, such as shown in Fig. 6, for example.

The turret 13 is mounted for rotation, as by a shaft 78 (Fig. 3) supported by a suitable frame 79 and arranged to be driven stepwise, in increments of twelve degrees, by means such as a motor 80. The arrangement is such that the turret is indexed stepwise about its axis to bring successive compartments into alignment with the discharge chute 68.

A separate set 14 of code bars is provided for each of the turret compartments, and all of the sets are mounted in fixed relation to the turret for rotation therewith. Advantageously, a set of code bars for a particular compartment is mounted directly below the compartment. In the illustrated form of the invention, each set 14 consists of ten code bars 81 movable between active or extended and inactive or retracted positions, as indicated at 81a and 81b respectively of Fig. 3a. The code bars are set by the coding solenoids 66 in a predetermined combination of active and inactive positions in accordance with a binary code determined by the actuation of the keyboards.

The secondary distribution system of the new apparatus is formed by a frusto-conical structure positioned below the turret 13 and divided to form a plurality of radially disposed, inclined main channels 16. Advantageously, the main channels 16 are equal in number to the turret compartments and, in the illustrated apparatus, there are thirty such main channels spaced uniformly twelve degrees apart and so oriented, with respect to the turret 13 and its indexing mechanism, that in all indexed positions of the turret each compartment 76 of the turret is aligned with a main channel 16 of the secondary distribution system.

As illustrated best in Fig. 5, each main channel 16 is subdivided in binary fashion into a plurality of secondary channels 17. In the illustrated apparatus, ten secondary channels are provided, the number of channels increasing toward the lower portion of the main channel, a configuration which is accommodated efficiently by the conical form of the structure. Thus, at the upper end of the main channel is an entrance passage 82, the dimensions of which approximate those of the lower end of the turret compartments 76. A short distance below its top, the main channel is widened and is divided to form two passages 83 by a central wall 84 extending substantially to the bottom of the channel. Further along the channel, the passages 83 are widened and are divided by walls 85 to form four parallel passages 86. The passages 86 are then widened, and each is divided by a wall 87 extending substantially to the bottom of the main channel, so that eight passages 88 are formed. Six of the passages 88, three on each side of the central wall 84, form secondary channels 17, while the outermost passages 88 are widened and further divided by walls 89 to form passages 90 constituting four more of the secondary channels 17, making a total of ten.

At the upper end of each of the dividing walls 84, 85, 87 and 89 there is provided a vane 18, hinged for movement between two operative positions. Each of the vanes 18 is adapted for separate actuation by a solenoid 91 associated therewith and, by actuating the solenoids in predetermined combinations, a letter entering the top passage 82 may be directed to any one of the ten secondary channels 17.

Each of the main channels 16 has associated therewith a set of control switches 19, mounted on the lower conical structure in alignment with the main channel and in position to cooperate with the sets of code bars carried by the rotating turret. In the illustrated apparatus, each set 19 comprises ten switches, one for each code bar of a set 14, positioned to be actuated by code bars in active positions.

In the apparatus of the invention, six of the switches, of a set of ten, are connected in such manner that, when actuated in predetermined combination, they will effect the actuation of a solenoid 92 to open the doors 77 of the turret compartment 76 then aligned with the main channel served by the switches. Thus, when a turret compartment and its associated code bars are advanced into alignment with a main channel, for which the code bars have been set, six of the code bars actuate six of the switches in the proper combination to effect the actuation of the solenoid 92. By means of an appropriate mechanism, the solenoid 92 opens the turret compartment doors 77 and causes the discharge by gravity of the letter into the top passage 82 of the main channel. An illustrative door operating mechanism is shown in Fig. 6, in which the doors 77 are shown to have operating levers 93 engaged by a yoke bar 94. The yoke bar is positioned to be engaged and pushed upward upon actuation of the solenoid 92 to pivot the doors 77 to open positions.

Four of the switches of each set are utilized for actuating the directive vanes 18 of the secondary distribution system, and these switches may be rendered effective by the actuation of the other six, in the proper combination to open the turret compartment doors, so that a letter discharged into the main channel is routed in the desired manner into a predetermined secondary channel 17. The four "directive" switches are, of course, actuated by four of the code bars of a set, which previously have been moved to an appropriate combination of active and inactive positions in accordance with the destination code imparted by the operator at the keyboard.

It should be observed, at this point, that the code bar sets of successive turret compartments are set by the operator, in accordance with the address on the letter which is then discharged into the compartment, after which the loaded compartments, together with the preset code bars, are advanced stepwise. In a complete cycle, each turret compartment will visit each main channel and, at one of the main channel positions, the combinations of code bars and switches will coincide to complete an electrical circuit through the switches and thereby effect the discharge of the letter into the main channel and the routing of the letter into a predetermined secondary channel.

At the bottom of each of the secondary channels 17 there is connected a transition channel 95, which advantageously is provided with a ninety degree twist, to effect reorientation of the letters from on-edge to flat positions, and which leads to one of a series of destination compartments 20. In the illustrated apparatus, there are three hundred destination compartments, one for each secondary channel, arranged in vertically and horizontally staggered relation about the base of the conical distribution structure, substantially in the manner indicated in Fig. 4.

Referring more particularly to Figs. 14–19, each of the destination compartments 20 is in the form of a box 96 adapted to receive a plurality of letters (e.g., 90 letters of average size), disposed horizontally and stacked one on top of the other. At the back, the box has an entrance opening near its top communicating with a transition channel 95 and, at the front, the box has a door 97 adapted to be opened from time to time for the discharge of mail.

Each box 96 has associated therewith improved arrangements for binding together letters collected in the box. Thus, mounted at opposite sides of each box 96 are cartridges 98, each supporting for rotation two reels 99 of tape 100, formed of a heat-sealable material, such as polyethylene. The reels 99 are arranged in opposed pairs and, initially, the tapes therefrom are joined together at the ends, as by causing the mechanism to be cycled, manually and laid inside the box through top openings 101 therein. In the illustrated arrangement, there are two sets of tapes laid in the box, one near each end, and the tapes are caused to conform to the side and bottom walls of the interior of the box by means of sets of arms 102, which are pivoted on the tape cartridges and are arranged to be actuated and retracted periodically (when the box is empty), by means such as a solenoid 103, to draw the tapes into the corners of the box, substantially as indicated in broken lines in Fig. 16.

During the continued operation of the apparatus, letters are discharged into the boxes 96 to form, in each box, a pile lying on top of the spaced tapes 100. When the pile reaches a predetermined height in the box, a photocell detector 104 mounted on the box is actuated to initiate several control functions. One of such functions is to prevent the further depositing of letters in the box, and this is accomplished without affecting the normal distributing functions of the apparatus by actuating a solenoid 105 to close a door 106 at the lower end of the transition channel leading to the box in question. Another of the functions is to initiate the binding of the collected letters into a coded packet, and this operation will be explained in further detail. Another function is to actuate an interlock circuit to prevent, for a certain period, the initiation of a binding cycle in any other box. A further function is to initiate the operation of a timer 107 (Fig. 20), which controls the binding operation and, when the binding operation is completed, causes the energization of solenoid 108, to open the compartment door 97, and the energization of an ejector solenoid 109 to advance a sweep 110 and push a bound packet or bundle of mail out of the compartment. And a still further function of the photocell detector 104 is to energize the actuating solenoid 111 to move into operative position a directive vane 24 which, as will be described in more detail, controls the travel of a bound packet of mail ejected from the compartment.

When a sealing cycle is initiated by the timer 107, a heater 115 (Fig. 20) is energized to heat a pair of sealing arms 114 mounted at opposite sides of the compartment. The arms 114, which are arranged in pairs, advantageously are of U-shaped configuration, disposed so that the tapes extending down into the box pass in front of the end section 115 of the U, while the tape strings leading to the supply reels 99 pass in back of the sections 115. Heat for sealing is generated in the sections 115, by current passing through a heating element therein for a predetermined time controlled by the timer 107. The sealing arms 114 of the illustrated apparatus are in the form of racks, engaged by gears 116. And the gears 116, in turn, are driven by pinions 117 engaged by racks 118 actuated by solenoids 119.

Simultaneously with the energization of the heating means 113, the solenoids 119 are energized to advance the sealing arms over the stack of letters in the box. As indicated in Fig. 17, the tapes 100 are carried over the tops of the letters, and a predetermined back tension is maintained on the tapes, so that the letters are enclosed tightly, near each end. The heated arms 114 meet at the center of the box, pressing the tapes together and effecting a heat sealing thereof over a substantial length, equal to the thickness of the end sections 115. While the heat seal is being effected, the tapes are parted intermediate the lengthwise extent of the heat seal, as by knife edges 120 provided on the end section 115 of one or both of the heated arms.

Under the control of the timer, the arms 114 are retracted, after the heat seal has been effected, leaving a tightly bound packet or bundle 121 of letters, separated from the tape supply, as shown in Fig. 19. The tapes 100 are retained in joined relation, after the sealing and parting operations, so that, upon subsequent actuation of the arms 102, the tapes again may be laid in the box in preparation for the accumulation of a new stack of letters.

Upon completion of the binding operation, followed by retraction of the heated arms 114, the timer effects the energization of the door and ejector solenoids 108, 109, so that the bound packet of mail is ejected from the compartment. In accordance with one aspect of the invention, the tape supplies for each compartment to have repetitively printed thereon a code number corresponding to the compartment, so that the code destination of the bundle is readily ascertainable for subsequent reference. And, as a matter of convenience, all the letters of a bundle are faced in the same direction so that such further sorting as may be necessary or desirable at a subsequent distribution center may be accomplished efficiently. It will be understood, of course, that other methods and means may be utilized to effect the bundling of the mail in a desired manner.

Figure 8:
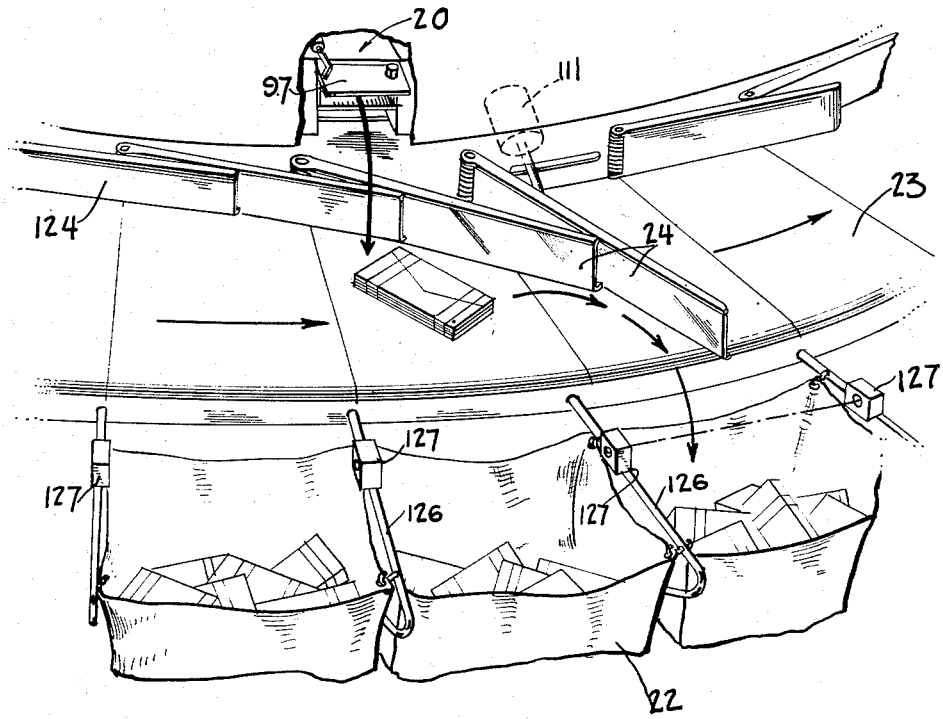
Fig. 8 is an enlarged, fragmentary perspective view of the apparatus of Fig. 1, illustrating means incorporated therein for depositing sorted mail in mail pouches.

As shown best in Figs. 3 and 8, there is provided about the base of the conical distribution structure an annular table 23, which is rotated, advantageously at a constant rate of about twenty revolutions per minute, by means of a suitable drive motor 123 (Fig. 20). The active surface of the table 23 is positioned radially outward of the front openings of the compartments 20, so that bound packets of mail discharged therefrom drop onto the table and are conveyed away thereby. An annular shroud 124 advantageously is positioned in spaced but surrounding relation to the compartment openings, as shown in Fig. 3, so that the ejected bundles are prevented from dropping beyond the outer edge of the table.

Mounted in fixed positions about the outer edge of the moving table 23 are deposit containers, such as mail pouches 22. The pouches 22 are held in open positions by pairs of arms 126 extending radially from the table support 21, so that bundles of mail may be directed over the outer edge of the table 23 and dropped into the pouches.

Advantageously, there are a lesser number of the pouches 22 than there are destination compartments 20. And, by way of example and not of limitation, in the illustrated apparatus there are fifty pouches to serve three hundred destination compartments. Nominally, then, each pouch serves six compartments; but such an arrangement is not necessary in actual practice, as the apparatus may be arranged, where necessary or desirable, so that some pouches serve more or less than six compartments.

As mentioned heretofore, one of the functions performed by the photocell detector 104 of a compartment, when actuated in response to the accumulation of a predetermined amount of mail in a compartment, is to actuate a selected one of a plurality of solenoids 111, to move a directive vane 24 into an operative position. In accordance with the invention, such directive vanes are provided about the entire inner periphery of the active table surface, in appropriate positions opposite each mail pouch. Thus, in the illustrated apparatus, there is one vane 24 for each mail pouch, pivoted at one end and movable to an operative position, as shown in Fig. 8, wherein a mail bundle travelling on the table surface is deflected by the vane into the desired pouch. The length of the vanes 24 is advantageously such that the free end of each vane overlaps a portion of the next vane. Accordingly, when a selected vane is pivoted to an active position, a plurality of vanes in advance of the selected one are moved outward a limited amount, so that a mail bundle travelling near the inner edge of the table is directed gradually outward while advancing to the fully extended vane.

In accordance with one of the more specific aspects of the invention, means, such as photocell detectors 127 are provided for each mail pouch 22 for actuation by a mail bundle dropping into the pouch from the rotating table 23. And, advantageously, the actuation of a detector 127 activates control circuitry to retract the extended vane 24, close the door 97 of the last emptied compartment and retract the ejector sweep 110 thereof, open the transition channel door 106 leading to the emptied compartment, reset the heat timer 107 (in response to retraction of the ejector sweep 110), and release the circuit interlock preventing the initiation of binding cycles in other compartments. If, at this time, another compartment has become filled to the predetermined level, a new binding cycle is initiated immediately by the photocell detector 104 for such compartment. In this respect, it will be understood that provision is made for the receipt by each compartment of approximately ten percent more mail than would be required to actuate the photocell detectors, to accommodate the infrequent occasions when an extra amount of mail is received by a compartment by reason of the interlock circuit being in effect. Usually, there is opportunity for only one or two extra letters to accumulate in a compartment, as the entire cycle, from the initiation of binding to the discharge of the bound packet into a mail pouch, is completed in about six seconds, which is sufficient time for the distribution of only twelve letters at maximum operating rates.

Normally, binding cycles are initiated only in response to the photocell detection of a predetermined amount of mail in a destination compartment. However, it is contemplated that appropriate circuitry (not specifically illustrated) may be provided to effect the binding and discharge of mail from all compartments at desired times. In such a clearing cycle, a plurality of compartments may be discharged at one time, so that the entire apparatus may be cleared in about five minutes. Periodic clearing cycles may be desirable, as at the end of a day or operating shift, for example, so that letters directed to destination compartments receiving a small amount of mail are not permitted to remain in the compartment an excessive length of time, awaiting the accumulation of sufficient mail to initiate a normal binding cycle.

By reference to Fig. 21, the approximate times for the various events of a distribution cycle may be ascertained. Thus, starting at top left in the time cycle diagram, there is provided a period of 200 milliseconds, in which the operator reads the address of a letter in the right hand viewing chamber 40 and determines mentally the appropriate destination code for the letter. The operator thereupon depresses three keys of the keyboard 58, serving the right hand chamber, a period of 100 milliseconds being the normal time required to depress each key. Thus, the time required by the operator to complete the reading and coding is about 500 milliseconds. And, at this point, the operator's activity with respect to the letter in the right hand chamber is complete and his attention is directed immediately to the reading and coding of a letter in the left hand chamber 39.

With the depression of the third key of the key-board, the solenoid 70 is actuated to retract the viewing chamber belt 42, which is accomplished in about 60 milliseconds, and the directive vane 46 is actuated to and held in a "right" position, as indicated in Fig. 12, for directing a new letter to the right hand chamber. The foregoing operations are followed, about 50 milliseconds after the depression of the third key, by the actuation of the coding solenoids 66 to set the code bars 14 on the appropriate compartment 76 of the turret 13. The 50 milliseconds delay prior to actuation of the coding solenoids results from the required prior operation of intermediate relays.

Approximately 140 milliseconds after the actuation period for the retracting solenoid 70, the belt 42 reaches a fully retracted position and the letter in the chamber has been discharged by gravity. Thereupon, the switch 72 is actuated to initiate return movement of the belt 42. This occurs approximately 700 milliseconds after the beginning of the cycle. At the same time, the solenoid 55 is energized to open the holding chamber doors 54, and the clutch 34' for the feed belt 31 is engaged, simultaneously to initiate feeding of a letter to the right hand viewing chamber, from the holding chamber 52, and to the holding chamber from the feed belt 31. The feeding operations require a period of about 200 milliseconds, toward the end of which the letter entering the holding chamber actuates the photocell detector 56 to shut the holding chamber doors and disengage the clutch 34'.

Approximately 350 milliseconds after retraction of the belt 42 is initiated, the letter discharged from the viewing chamber 40 has traversed the chute 68 and has been received in the coded turret compartment. The traverse of the letter is detected by the photocell means 75 and indexing of the turret is thereupon initiated. The turret indexing is completed in about 100 milliseconds and, as will be observed in Fig. 21, the complete series of operations, up to this point has consumed about one second.

Ideally, completion of turret indexing coincides with the depressing of the third key of the left hand keyboard. However, where an adroit operator completes a second coding series prior to the traverse of the next preceding letter through the chute 68 and past the photocell 75, an interlock circuit temporarily prevents the further actuation of the coding means, so that proper, sequential coding of the turret compartments is assured. Thus, an operator cannot get ahead of the machine by attempting to code letters at a rate faster that the letters are accepted by the machine.

A letter may remain in its coded turret compartment for an indeterminate period, while the turret is indexed stepwise, to carry the compartment to the appropriate main channel of the secondary distributing means. When the turret indexes to a position in which one or more of the sets of code bars match one or more sets of switches, solenoids 91 and 92 are actuated to open the appropriate turret compartment doors 77 and set the vanes 18 of the appropriate main channel or channels 16. Such actuation consumes about 50 milliseconds. The released letter (or letters) then traverses by gravity the passages of the main channel and is directed into and through the appropriate secondary channel 17 in a period of about 400 milliseconds, the letter thereafter requiring about 200 milliseconds to traverse by gravity the transition channel 95 and reach the destination compartment 20. The letter may then remain in the destination compartment for an indeterminate period, until a binding cycle is initiated in response to the accumulation of a predetermined amount of mail in the compartment. Binding ordinarily requires about three seconds, and an additional three seconds may be required to complete the discharge of the bound and coded packet and the conveyance thereof by the table 23 to the appropriate mail pouch.

One of the principal advantages of the invention resides in the fact that an apparatus of relatively small size and of generally simplified nature, may be utilized to carry out at high speed a large number of handling and distributive functions on letters fed successively thereto. In large part, the advantageous characteristics of the new apparatus are derived from the improved arrangement of primary and secondary distribution facilities, whereby secondary distribution is effected after discharge of a letter from the primary distributing means but in response to a code actuation effected through the intermediary of the primary distributing means. The conical form of the distribution system is particularly advantageous, in that conveyance of the letters may be effected largely by gravity and in that the distribution passages or channels may be increased in number toward the base of the conical structure, being accommodated conveniently by the increased circumference thereof. By way of example, an apparatus capable of sorting 7,200 letters per hour into three hundred destinations occupies as little as 154 square feet of floor space.

Further substantial advantages are realized in the new apparatus by the provision of improved code control means, including sets of code bars carried along with the turret compartments and arranged not only to effect the discharge of a letter from a compartment into a predetermined main channel but, in addition, to effect the actuation of directive vanes in the main channel, to route the discharged letter to a predetermined destination compartment. The improved control arrangement permits the use of an efficient and generally simplified binary control system substantially throughout and minimizes the possibility of error in the directive control. The code control system of the illustrated apparatus is adapted for manual actuation, by an operator seated at the letter receiving station. However, it will be understood that simple adaptations will render the apparatus capable of fully automated operation, as by the provision of means for electrically "reading" code numbers theretofore printed on the letters. Thus, the new apparatus may be incorporated in a comprehensive mail distribution system, in which letters are coded initially and thereafter handled on most future occasions by automatic means capable of reading the code. Where appropriate, automatic facing and cancelling apparatus also may be incorporated in the system to supply letters to the elevator conveyor 25, rendering the entire operation substantially wholly automatic.

One of the specific advantageous features of the invention resides in the use of a simplified binary coded decimal (BCD) control system, using six code bars to control the primary sorting of mail into 30 main channels, and four code bars to control the secondary sorting of mail into the ten secondary channels of a main channel. As will be understood, six code bars may be set in sixty-four different combinations, and four bars may be set in sixteen combinations. However, by using only thirty and ten of the respective possible combinations, it is possible substantially to simplify the coding system and the mechanism for converting the code numbers to the binary code.

A particularly advantageous feature of the new apparatus resides in its ability to classify the mail into a large number of groups and thereafter to consolidate the groups, in the form of coded packets or bundles, into a lesser number of categories for shipment to further distribution centers. In the illustrated apparatus, the consolidation is effected by the provision of novel means for conveying coded bundles of mail from several destination compartments to one of a plurality of mail pouches disposed about the base of the conical distribution system.

It should be understood that the specific form of the invention illustrated and described herein is intended to be representative only, as certain changes may be made therein without departing from the clear teachings of the disclosure. Specifically, it would be understood that the apparatus of the invention may be utilized to effect the sorting of objects other than letters, such as punch cards, hardware, packages and electronic components, for example, and, where reference is made in the specification and claims hereof to a "mail sorting" apparatus, the term "mail sorting" or equivalent is intended to be illustrative only and is meant to include the sorting of all types of articles capable of accommodation by an apparatus as described and claimed.

I claim:

1. A mail sorting apparatus comprising, primary distributing means having a plurality of compartments each adapted to receive a single piece of mail, means for moving said primary distributing means to carry the compartments thereof through a predetermined path, secondary distributing means disposed along said path and adapted to receive mail from said compartments, said secondary distributing means comprising a plurality of main channels each subdivided into a plurality of secondary channels, flow directive means in each of said main channels for diverting individual pieces of mail into predetermined ones of the secondary channels, and control means for predetermining which one of the several main channels receives a specific piece of mail and for setting the flow directive means of said one main channel to route said specific piece of mail into a predetermined secondary channel.

2. The mail sorting apparatus of claim 1, in which the control means comprises a plurality of first control elements associated with each of the several compartments of the primary distributing means and movable with said compartments, and a plurality of second control elements associated with the main channels of said secondary distributing means, the first control elements of a compartment being preset in accordance with the destination of a piece of mail deposited in said compartment and being thereafter operative to effect the discharge of said piece of mail into a preselected main channel and to effect a preselected setting of the directive means of such main channel.

3. The mail sorting apparatus of claim 2, in which the first control elements comprise code bars presettable in a plurality of combinations of active and inactive positions, the second control elements are switching devices actuated individually by individual code bars set in active positions, the switching devices of each main channel being associated in predetermined combination to effect a control function when actuated in said predetermined combination.

4. The mail sorting apparatus of claim 1, in which the primary distributing means is a turret mounted for rotation and having a plurality of radially disposed compartments for receiving individual pieces of mail, and said secondary distributing means comprises a plurality of main channels disposed radially about the edges of said turret.

5. The mail sorting apparatus of claim 4, in which the means for moving the primary distributing means comprises means for indexing said turret in a step-by-step manner in one direction, delivering means are provided for delivering pieces of mail one at a time to the compartments of the turret, and control means are provided for effecting indexing movement of said turret in response to the delivery to a turret compartment of a piece of mail.

6. The mail sorting apparatus of claim 5, in which the delivery means comprises means to deliver pieces of mail one at a time to a viewing station and means to effect conveyance of a piece of mail from the viewing station to a compartment of the turret at a predetermined location, and the means for indexing operates upon delivery of a piece of mail to a compartment to rotate said turret to bring the next successive compartment to said predetermined location.

7. The mail sorting apparatus of claim 1, which includes a plurality of mail receiving and coding compartments, one for each secondary channel, adapted to receive and code mail directed into such secondary channel, a plurality of mail deposit stations, each serving a plurality of receiving and coding compartments, and transfer means for conveying mail from said receiving and coding compartments to the respective deposit stations therefor.

8. The mail sorting apparatus of claim 7, in which the receiving and coding compartments include means to receive and store a plurality of pieces of mail, means to detect the presence in said compartments of a predetermined amount of mail, and means responsive to the detecting means to bundle and code the mail in said predetermined quantities.

9. The mail sorting apparatus of claim 7, in which the transfer means comprises a moving surface travelling adjacent said receiving and coding compartments and adapted to receive mail therefrom, means adjacent the travelling surface for supporting a plurality of mail pouches, and selectively operable deflector means movable to positions obstructing the movement of mail along said travelling surface and deflecting said mail into selected mail pouches.

10. The mail sorting apparatus of claim 9, in which the primary distributing means comprises a turret rotatable about a vertical axis, the secondary distributing means comprises a plurality of channels disposed generally radially about said turret, and said travelling surface comprises an annular table rotating about said channels.

11. The mail sorting apparatus of claim 10, in which said turret and channels are arranged in generally conical configuration with said turret at the apex, and said annular table is disposed adjacent the base of the conical structure.

12. A mail sorting apparatus comprising, means to convey individual pieces of mail to a viewing station, a turret for receiving mail from the viewing station, said turret having a plurality of compartments, each adapted to receive a single piece of mail, mail receiving channels disposed about said turret and adapted to receive mail from the compartments thereof, means for rotating said turret in step-by-step manner to bring successive compartments thereof into position to receive mail from said viewing station, and control means for effecting the discharge of mail from the turret compartments into predetermined mail receiving channels, said control means comprising selectively actuable means for coding each of said compartments independently and in sequence to effect discharge of mail from said compartments in accordance with the address indications on said mail.

13. The mail sorting apparatus of claim 12, in which the turret is of generally conical configuration, the compartments of the turret are disposed generally radially about the axis of rotation thereof in inclined relation, and gate means are provided at the lower ends of the turret compartments to provide for discharge of mail therefrom by gravity.

14. A mail sorting apparatus comprising, means to convey individual pieces of mail to a viewing station, a turret for receiving mail from the viewing station, said turret having a plurality of compartments, each adapted to receive a single piece of mail, mail receiving channels disposed about said turret and adapted to receive mail from the compartments thereof, means for rotating said turret in step-by-step manner to bring successive compartments thereof into position to receive mail from said viewing station, and control means for effecting the discharge of mail from the turret compartments into predetermined mail receiving channels, said control means comprising control elements for each compartment of said turret and means for presetting the control elements of a compartment in accordance with the address of a piece of mail in said viewing station, said viewing station including discharge means operable in response to the presetting of the control elements of one compartment to effect discharge of mail from said viewing station into said one compartment, said means for rotating comprising means to detect the transfer of mail from said viewing station to said one compartment and to effect rotation of said turret in response thereto whereby to present a successive compartment in position to receive mail from said viewing station.

15. The mail sorting apparatus of claim 14, in which chute means are provided for effecting the discharge of mail from said viewing station into a turret compartment, and the detecting means comprises a photoelectric cell and a light source therefor positioned adjacent said chute means in position to be actuated by the passage through the exit end section of said chute means of a piece of mail.

16. A mail sorting apparatus comprising, a mail viewing station, means to convey mail to said viewing station, mail distributing means positioned to receive mail from said viewing station, and control means for operation manually in accordance with the address of mail presented to said viewing station and acting upon said distributing means to effect a predetermined distribution of mail received by said distributing means, said viewing station comprising a pair of viewing chambers positioned generally side by side, means for presenting individual pieces of mail alternately to said chambers, and means for discharging mail individually from said chambers into said distributing means.

17. The mail sorting apparatus of claim 16, in which conveyor belt means are disposed below said chambers for presenting mail thereto from one side, means are provided for feeding pieces of mail individually from said one side, the conveyor belt means is divided adjacent said one side by a member forming a back wall of one chamber, and a movable directive vane is positioned in advance of said back wall member to guide mail alternately in front and in back thereof, mail passing in back of said wall member being conveyed to the viewing chamber farthest removed from the feeding means.

18. The mail sorting apparatus of claim 17, in which the conveyor belt means comprises a separate conveyor belt for each chamber, and means are provided for retracting the belts individually to effect the discharge of mail from said chambers.

19. The mail sorting apparatus of claim 18, in which the means to feed mail from one side comprises a conveyor belt and door means forming with the conveyor belt a holding chamber, the holding chamber belt urges individual pieces of mail against said door means, means are provided for opening said door means upon discharge of a piece of mail from one of said reading chambers to effect feeding of a new piece of mail to said one chamber, and means are provided for presenting a piece of mail to the holding chamber belt and for closing said door means.

20. The mail sorting apparatus of claim 19, in which the means for presenting a piece of mail to the holding chamber belt comprises a feed belt, and photoelectric means are provided for detecting the presentation of a piece of mail to the holding chamber belt and for closing said door means and deactivating said feed belt in response thereto.

21. In a mail sorting apparatus comprising, a mail viewing station, conveyor means for presenting individual pieces of mail to said viewing station, mail distributing means, and means for discharging mail from said viewing station into said distributing means, said conveyor means comprising conveyor belt means adapted to be driven continuously, door means positioned in blocking relation to said conveyor belt means to prevent, when closed, the presentation of mail to said viewing station, means to effect opening of said door means upon the discharge of mail from said viewing station, means to feed a new piece of mail onto said conveyor belt means, and means responsive to the feeding of a new piece of mail onto said conveyor belt means to effect closure of said door means.

22. The apparatus of claim 21, in which said means to feed comprises a feed belt mounted for movement about vertical axes, means for presenting vertically oriented pieces of mail to the surface of said feed belt, means for actuating said feed belt upon the discharge of mail from said viewing station, and means for effecting the deactuation of said feed belt in response to the feeding of a new piece of mail onto said conveyor belt means.

23. The apparatus of claim 22, in which the means for effecting deactuation of the feed belt comprises photoelectric means positioned adjacent the conveyor belt means and adapted to detect the movement of a piece of mail thereby to a predetermined position adjacent said viewing station.

24. The apparatus of claim 22, in which the means for presenting vertically oriented pieces of mail to the feed belt comprises a supply conveyor positioned generally at right angles to said feed belt and driven to advance horizontal stacks of vertically oriented mail toward and into flat contact with said feed belt, a roller is positioned opposite said feed belt and is driven to rotate in a direction complementary to the movement of the feed belt whereby to assist said belt in the feeding of mail toward the conveyor means and viewing station, and roller means are positioned opposite said feed belt between said roller and said conveyor means and are driven to rotate in a direction in opposition to the movement of the feed belt, said roller means including at least one feedback roller which, in cooperation with said feed belt, forms a space for the passage of one piece only of mail.

25. The apparatus of claim 22, in which the means for presenting vertically oriented pieces of mail to the feed belt comprises a supply conveyor positioned generally at right angles to said feed belt and driven to advance horizontal stacks of vertically oriented mail toward and into flat contact with said feed belt, drive means are provided for said supply conveyor tending to drive said conveyor continuously, and switch means are positioned behind the surface of said feed belt into which mail is advanced, said switch means being operative to effect deactuation of the supply conveyor drive means in response to the establishment of a predetermined pressure contact between said feed belt and said mail.

26. The apparatus of claim 21, which includes supply conveyor means for presenting mail to said conveyor means, said supply conveyor means comprising an elevator conveyor belt for carrying stacks of mail oriented normal to the surface of the belt, said elevator conveyor extending to a level below said conveyor means and being adapted to carry said stacks of mail upward to said conveyor means, said elevator conveyor having retractable partition means adapted when projected from the surface of the belt to support stacks of mail in normal relation to the surface of said belt, and means cooperating with the elevator conveyor belt and the partitions to effect timed projection and retraction of said partitions during the cycles of movement of the belt.

27. A mail sorting apparatus comprising, a large plurality of mail receiving channels, means for distributing mail and discharging it into said channels in accordance with the address of the mail, a mail receiving compartment positioned at the end of each of said channels and adapted to receive a plurality of pieces of mail, and means in each compartment responsive independently of the means for any other compartment to the deposit of a predetermined amount of mail in the compartment periodically to secure the mail in such compartment in a bundle and to discharge the bundle from the compartment.

28. The mail sorting apparatus of claim 27, which includes photoelectric detecting means in each receiving compartment positioned to detect the presence in the compartment of a predetermined amount of mail and to effect the securing thereof into a bundle and the discharge thereof from the compartment.

29. A mail sorting apparatus comprising, a large plurality of mail receiving channels, means for distributing mail and discharging it into said channels in accordance with the address of the mail, a mail receiving compartment positioned at the end of each of said channels and adapted to receive a plurality of pieces of mail, and means operable periodically to secure the mail in a receiving compartment in a bundle and to discharge the bundle from the compartment, said means to secure the mail in bundles comprising supplies of heat-sealable tape positioned at opposite sides of the receiving compartments, the tape supplies for each compartment comprising two tapes joined end to end by heat sealing and laid along the bottom and side edges of the compartment, said compartments and channels being so related as to cause the discharge of mail into the compartments on top of the tapes therein, and movable heating elements mounted at opposite sides of said compartments for inward movement over the tops of bundles of mail, said heating elements having opposing surfaces over which the tape supplies are caused to pass, whereby upon inward movement of said heating elements the tapes are brought into contacting relation in the presence of heat to effect a sealing together of the tapes and a securing of the bundles, said opposing surfaces being shaped to effect the heat sealing of said tapes over a predetermined length and a severance of the tapes intermediate said length, whereby to maintain the tapes joined end to end while effecting the securing of a bundle of mail.

30. The mail sorting apparatus of claim 29, in which retractable arms are mounted adjacent said receiving compartments generally above said tapes, and means are provided to move said arms into said compartments following the securing of a bundle of mail and the ejection thereof from said compartments to cause said tapes to be disposed along the bottom and side walls of the compartments.

31. A mail sorting apparatus comprising, a large plurality of mail receiving channels, means for distributing mail and discharging it into said channels in accordance with the address of the mail, a mail receiving compartment positioned at the end of each of said channels and adapted to receive a plurality of pieces of mail, means operable periodically to secure the mail in a receiving compartment in a bundle and to discharge the bundle from the compartment, a smaller plurality, less than said large plurality, of mail deposit stations, and transfer means for conveying bundles of mail ejected from said compartments to selected ones of said deposit stations.

32. The mail sorting apparatus of claim 31, in which the transfer means comprises a transfer surface travelling adjacent the several mail receiving compartments and adapted to receive mail therefrom, and deflector vanes disposed adjacent said transfer surface and movable selectively into obstructing relation thereto whereby to deflect bundles of mail moving with said surface toward a preselected deposit station.

33. The mail sorting apparatus of claim 32, in which the outlets of the receiving compartments through which mail is ejected are arranged in circular configuration, said transfer surface is an annular table positioned below and mounted for rotation about said outlets, and said deflector vanes are mounted adjacent said table for pivoting movement over the top surface thereof.

34. The mail sorting apparatus of claim 33, in which said deflector vanes are mounted for pivoting movement about vertical axes and are spaced substantially uniformly about said annular table, and the horizontal length of said vanes is greater than the spacing between the pivoting axes of adjacent vanes, whereby the outward pivoting movement of a predetermined deflector vane to an obstructing position effects partial pivoting movement of at least the next preceding vane.

35. A mail sorting apparatus comprising, a large plurality of mail receiving channels, means for distributing mail and discharging it into said channels in accordance with the address of the mail, a mail receiving compartment positioned at the end of each of said channels and adapted to receive a plurality of pieces of mail, means operable periodically to secure the mail in a receiving compartment in a bundle and to discharge the bundle from the compartment, door means at the exit end of each receiving channel for closing off the channel to prevent the discharge of mail therefrom into the compartment communicating therewith, compartment door means at the end of each compartment opposite from the channel door means, means for closing the door means of a channel during the operation of the securing means of the compartment served by the channel, and means for opening the compartment door means during the operation of the ejecting means of the compartment.

36. The mail sorting apparatus of claim 35, in which means are provided in each compartment for actuating the securing and ejecting means thereof automatically in response to the presence in the compartment of a predetermined amount of mail, and interlocking control means are provided to prevent the actuation of the securing and ejecting means of any compartment during the operation of the securing and ejecting means of any other compartment.

37. The mail sorting apparatus of claim 36, which includes a plurality of mail deposit stations positioned to receive bundled mail from said compartments, detecting means are positioned adjacent each of said deposit stations to detect the deposit therein of bundled mail, and said detecting means are associated with said interlocking control means whereby to render the interlocking control means ineffective in response to the actuation of detecting means by the deposit of a bundle of mail at a predetermined deposit station.

38. A mail sorting apparatus comprising, a viewing chamber, means to feed individual pieces of mail successively to said viewing chamber, mail distributing means associated with said viewing chamber and adapted to receive mail therefrom, said distributing means comprising a plurality of mail receiving compartments each adapted to receive a single piece of mail, code control means operable from a control station positioned in front of said viewing chamber, said code control means being actuated by an operator to effect a predetermined distribution of mail discharged into said compartments from said viewing chamber, means for indexing the distributing means to present successive chambers thereof to a mail receiving position and interlocking control means acting between the indexing means and the code control means to prevent actuation of the code control means in the period following a first actuation thereof and ending with the actuation of said indexing means.

39. The mail sorting apparatus of claim 38, in which a discharge path is provided for effecting the transfer of mail from said viewing chamber to said compartments, and photoelectric means are provided near the exit end of said discharge path for actuation by a piece of mail entering one of said compartments, actuation of said photoelectric means being operative to actuate said indexing means and to render ineffective said interlocking control means.

40. The mail sorting apparatus of claim 38, in which the code control means comprises a manually actuated keyboard, code transfer means are actuated by said keyboard for predetermining the distribution by said distributing means of a piece of mail in said viewing chamber, and discharge means are operated in response to the actuation of the last of a predetermined number of keys of said keyboard to effect discharge of a piece of mail from said viewing chamber to a compartment of said distributing means.

41. The mail sorting apparatus of claim 40, which includes a plurality of viewing chambers positioned in side-by-side relation, said discharge means includes separately operable means for each viewing chamber, and said separately operable means are actuated in sequence by said code control means.

42. A mail sorting apparatus comprising, primary distributing means movable along a predetermined path and having thirty compartments therein each adapted to receive one piece of mail, means for discharging mail into said compartments, secondary distributing means comprising thirty main channels positioned along said predetermined path and adapted to be visited by each of the compartments of the primary distributing means, each of said main channels being subdivided into ten secondary channels and having controllable directive means therein for directing the movement of a piece of mail selectively into any of said secondary channels, control means for effecting the discharge of individual pieces of mail into predetermined compartments of said primary distributing means, said control means including a code control for predetermining the main and secondary channel into which a piece of mail is directed, said code control means comprising a set of ten code bars for each compartment of the primary distributing means mounted for movement therewith, said code bars having active and inactive positions and the sets of code bars being movable into combinations of active and inactive positions by said control means, first switch means for effecting the discharge of mail from said primary distributing means into predetermined channels of said secondary distributing means, and second switch means for controlling the directive means of the main channels, six of the code bars of a set being operative, when preset in a predetermined combination, to effect the discharge of mail from a compartment into a predetermined main channel, and four of the code bars of the set being operative to control the directive means of said predetermined main channel to direct the discharged mail into a predetermined secondary channel.

43. The apparatus of claim 42, in which the primary distributing means comprises a turret rotatable in a step-by-step manner in one direction, the sets of code control bars are mounted on the turret for rotation therewith, said first and second switch means are mounted on said secondary distributing means, and said code control means comprises means to set the code bars associated with a compartment in a predetermined position and means to effect the discharge of mail to such compartment.

44. A mail sorting apparatus comprising primary distributing means having a plurality of mail receiving compartments movable through a predetermined path, secondary distributing means disposed along said path and having a plurality of main channels for receiving mail from said compartments, said main channels being divided into a plurality of secondary channels, and binary control means for effecting the discharge of mail from said compartments into predetermined main channels and into predetermined secondary channels thereof, said binary control means comprising cooperating sets of control elements associated respectively with said compartments and said main channels.

45. The mail sorting apparatus of claim 44, in which the cooperating sets of control elements comprise a plurality of switches and a plurality of code elements, each code element having an active position, in which it is adapted to actuate a cooperating switch, and an inactive position.

References Cited in the file of this patent
UNITED STATES PATENTS

| | | |
|---|---|---|
| 1,482,311 | Long et al. | Jan. 29, 1924 |
| 2,564,185 | Bailey | Aug. 14, 1951 |
| 2,882,658 | Weisman | Apr. 21, 1959 |